United States Patent
Knatz et al.

(10) Patent No.: US 12,287,006 B2
(45) Date of Patent: Apr. 29, 2025

(54) MULTI-ROW THRUST BEARING WITH SIGMA CAGE

(71) Applicant: JTEKT Bearings North America LLC, Greenville, SC (US)

(72) Inventors: Stefan Knatz, Bielefeld (DE); Matthias Czogalla, Versmold (DE)

(73) Assignee: JTEKT Bearings North America LLC, Greenville, SC (US)

( * ) Notice: Subject to any disclaimer, the term of this patent is extended or adjusted under 35 U.S.C. 154(b) by 17 days.

(21) Appl. No.: 18/109,683

(22) Filed: Feb. 14, 2023

(65) Prior Publication Data
US 2023/0258233 A1    Aug. 17, 2023

Related U.S. Application Data

(60) Provisional application No. 63/310,790, filed on Feb. 16, 2022.

(51) Int. Cl.
*F16C 19/30*     (2006.01)
*F16C 33/46*     (2006.01)
(Continued)

(52) U.S. Cl.
CPC .......... *F16C 33/467* (2013.01); *F16C 19/305* (2013.01); *F16C 33/48* (2013.01); *F16C 33/541* (2013.01); *F16C 33/546* (2013.01)

(58) Field of Classification Search
CPC ........ F16C 19/30; F16C 19/305; F16C 19/48; F16C 33/467; F16C 33/4676;
(Continued)

(56) References Cited

U.S. PATENT DOCUMENTS

| 718,111 A | 1/1903 | Eveland |
| 811,136 A | 1/1906 | Eveland |

(Continued)

FOREIGN PATENT DOCUMENTS

| CN | 206268292 U | 6/2017 |
| DE | 102021119494 A1 | 2/2023 |

(Continued)

OTHER PUBLICATIONS

Machine Translation of JP 2003-083333 (Year: 2003).*

(Continued)

*Primary Examiner* — Alan B Waits
(74) *Attorney, Agent, or Firm* — Nelson Mullins Riley & Scarborough LLP

(57) ABSTRACT

A thrust bearing assembly comprises a cage including an annular portion. A first flange extends axially from an inner peripheral edge of the annular portion, and a second flange extends axially from an outer peripheral edge of the annular portion. A first plurality of roller pockets are defined by the annular portion, the first roller pockets of the first plurality of roller pockets being spaced evenly about the annular portion. A second plurality of roller pockets are defined by the annular portion, the second roller pockets of the second plurality of roller pockets being evenly spaced about the annular portion so that each second roller pocket is disposed between adjacent first roller pockets.

12 Claims, 3 Drawing Sheets

(51) Int. Cl.
*F16C 33/48* (2006.01)
*F16C 33/54* (2006.01)

(58) Field of Classification Search
CPC .... F16C 33/4682; F16C 33/48; F16C 33/485; F16C 33/54; F16C 33/541; F16C 33/542; F16C 33/543; F16C 33/545; F16C 33/546
See application file for complete search history.

(56) References Cited

U.S. PATENT DOCUMENTS

| | | | |
|---|---|---|---|
| 5,335,416 | A | 8/1994 | Alling |
| 6,843,605 | B2 | 1/2005 | Tamada et al. |
| 7,134,794 | B2 * | 11/2006 | Obayashi ............ F16C 33/4676 384/623 |
| 7,273,318 | B2 | 9/2007 | Hayashi et al. |
| 7,273,319 | B2 | 9/2007 | Tamada et al. |
| 7,707,723 | B2 | 5/2010 | Tamada et al. |
| 8,182,157 | B2 | 5/2012 | Shattuck et al. |
| 9,790,993 | B1 | 10/2017 | Makke |
| 2008/0025661 | A1 * | 1/2008 | Obayashi .............. F16C 33/546 384/623 |

FOREIGN PATENT DOCUMENTS

| | | | | |
|---|---|---|---|---|
| EP | 1500833 | A1 | 1/2005 | |
| JP | 2003083333 | A * | 3/2003 | .............. F16C 19/30 |
| JP | 2003-156050 | A | 5/2003 | |
| JP | 2005076848 | A | 3/2005 | |
| JP | 3871537 | B2 | 1/2007 | |
| JP | 2007224978 | A * | 9/2007 | .............. F16C 19/30 |
| JP | 2007255554 | A | 10/2007 | |
| WO | WO-2016119789 | A1 * | 8/2016 | ............ F16C 33/485 |

OTHER PUBLICATIONS

Machine Translation of JP 2007-224978 (Year: 2007).*
Machine Translation of WO 2016-119789 (Year: 2016).*
French Search Report, Corresponding FR2301458, dated Aug. 29, 2024, 8 pages.

* cited by examiner

MULTI-ROW THRUST BEARING WITH SIGMA CAGE

PRIORITY CLAIM

This application is based upon and claims the benefit of provisional application No. 63/310,790, filed Feb. 16, 2022, which is incorporated fully herein by reference for all purposes.

FIELD OF THE INVENTION

The present invention relates generally to roller thrust bearings. More particularly, the present invention relates to a roller thrust bearing including multiple rows of rollers.

Thrust bearings are designed to support a predominantly axial load. In one construction of the prior art, a thrust bearing has a cage formed from a single piece of metal. The cage is made into a shape which, along with specially configured openings, retains and guides a plurality of cylindrical roller elements. In cross-section, this type of cage has a shape similar to that of the Greek letter sigma.

Various thrust bearings of the prior art are shown and described in U.S. Pat. No. 8,182,157 B2, incorporated herein by reference for all purposes.

SUMMARY OF THE INVENTION

One aspect of the present invention provides a thrust bearing assembly comprising a cage including an annular portion. A first flange extends axially from an inner peripheral edge of the annular portion, and a second flange extends axially from an outer peripheral edge of the annular portion. A first plurality of roller pockets are defined by the annular portion, the first roller pockets of the first plurality of roller pockets being spaced evenly about the annular portion. A second plurality of roller pockets are defined by the annular portion, the second roller pockets of the second plurality of roller pockets being evenly spaced about the annular portion so that each second roller pocket is disposed between adjacent first roller pockets.

According to this aspect, each first roller pocket includes two radially aligned roller elements disposed therein and each second roller pocket includes one roller element disposed therein. The annular portion of the cage defines an innermost valley, a first annular hill, an intermediate valley, a second annular hill, and an outermost valley, all of which are concentric with each other.

In some exemplary embodiments, each of the first plurality of roller pockets are defined in all of the innermost valley, the first annular hill, the intermediate valley, the second annular hill, and the outermost valley. In some exemplary embodiments, each of the second plurality of roller pockets are defined only in the intermediate valley, the second annular hill, and the outermost valley.

In some exemplary embodiments, a first one of the two radially aligned roller elements in each of the first plurality of roller pockets extends adjacent to the first annular hill and a second one of the two radially aligned roller elements in each of the first plurality of roller pockets extends adjacent to the second annular hill. Respective ends of each of the first one and the second one of the two radially aligned roller elements may be adjacent one of the valleys.

In some exemplary embodiments, respective ends of the roller element disposed in a respective of the second roller pockets are adjacent one of the valleys. The annular portion of the cage may further defines a hub portion radially inside of and concentric with the innermost valley.

In some exemplary embodiments, the first plurality of roller pockets includes at least ten roller pockets and the second plurality of roller pockets includes at least ten roller pockets. For example, the thrust bearing assembly may have at least thirty of the roller elements. The cage may be formed of a unitary piece of metal.

According to another aspect, the present invention provides a thrust bearing assembly comprising a cage including an annular portion defining an innermost valley, a first annular hill, an intermediate valley, a second annular hill, and an outermost valley, all of which are concentric with each other. A first plurality of roller pockets are defined by the annular portion, the roller pockets of the first plurality of roller pockets being spaced evenly about the annular portion. The roller pockets of the first plurality of roller pockets are each defined in all of the innermost valley, the first annular hill, the intermediate valley, the second annular hill, and the outermost valley. Two radially aligned roller elements are disposed in each of the roller pockets such that a first one of the two radially aligned roller elements in each roller pocket extends adjacent to the first annular hill, a second one of the two radially aligned roller elements in each roller pocket extends adjacent to the second annular hill, and respective ends of each of the first one and the second one of the two radially aligned roller elements are adjacent one of the valleys.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
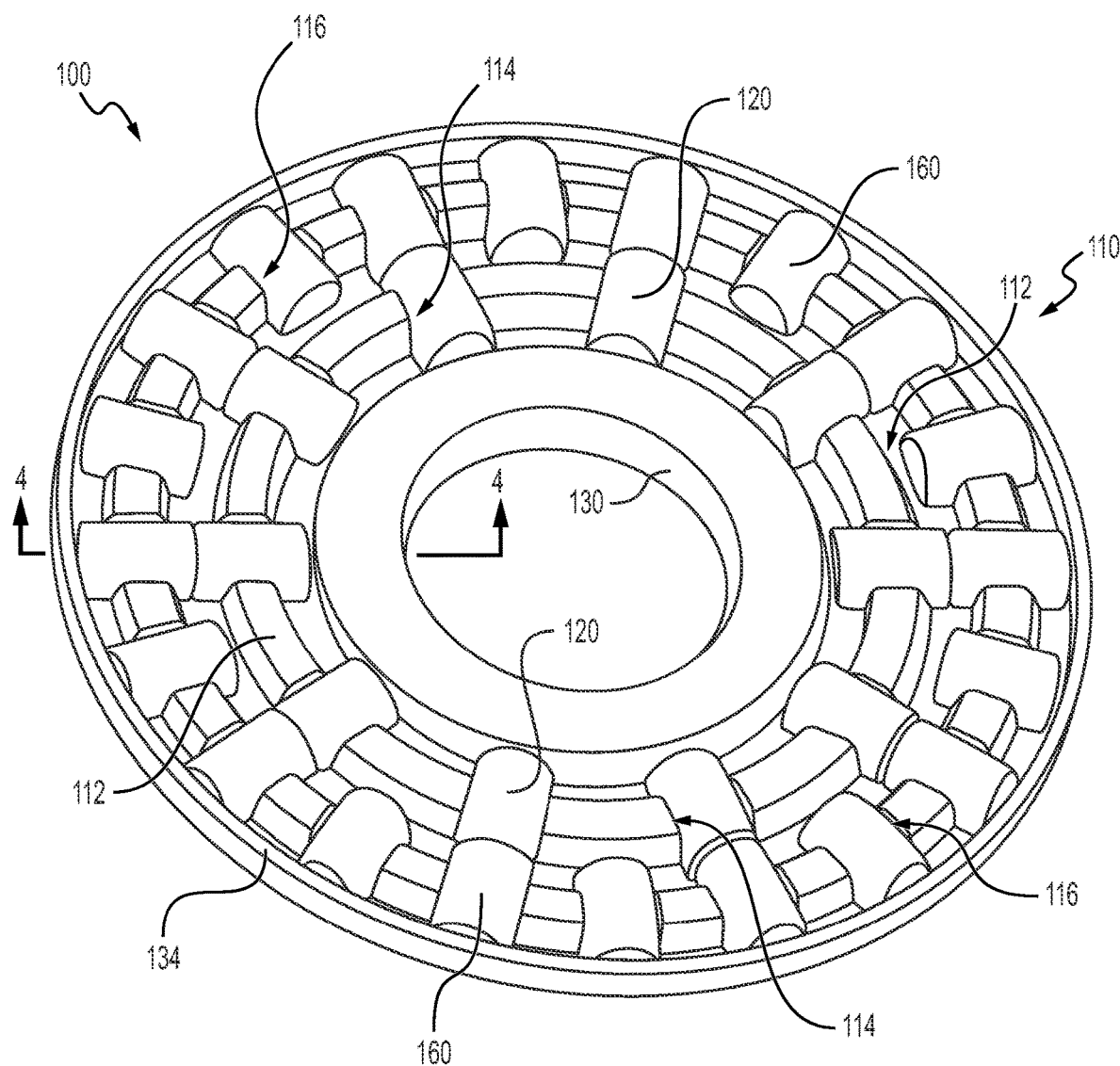
FIG. 1 is a top perspective view of a multi-row thrust bearing assembly with a multiple "sigma" cage in accordance with an embodiment of the present invention.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
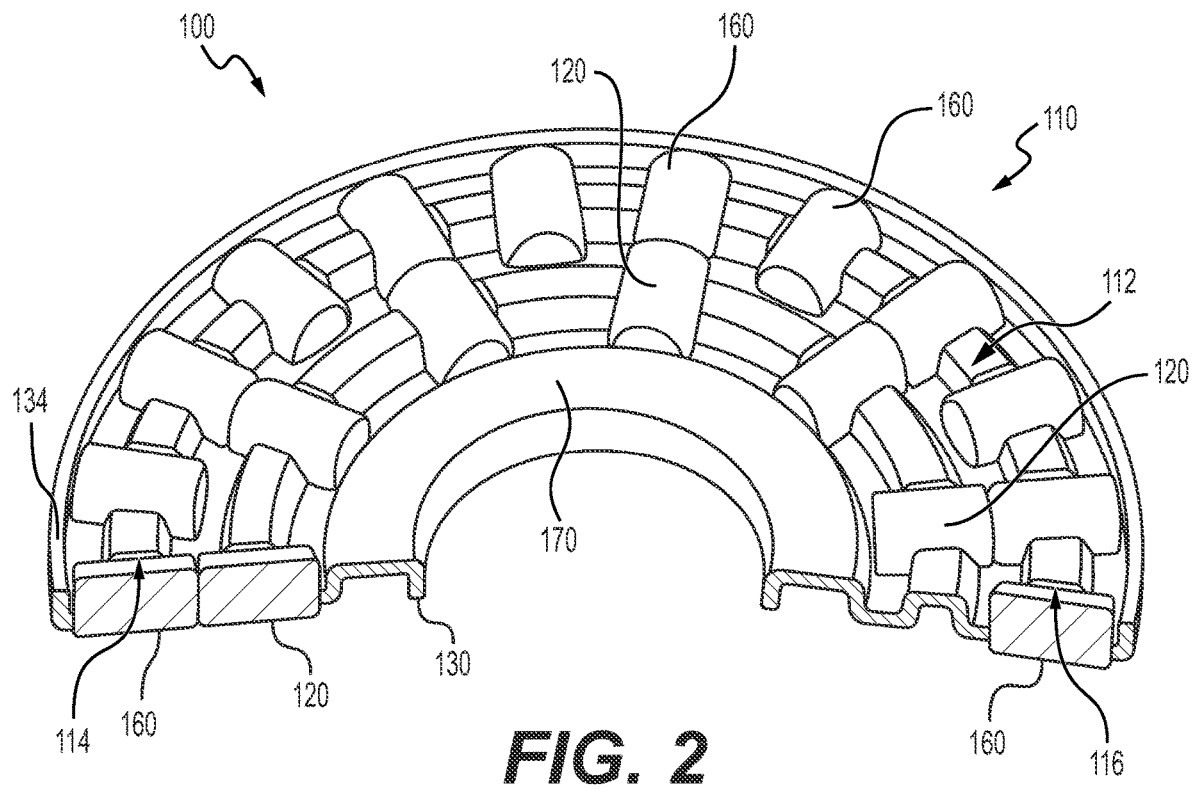
FIG. 2 is a partial-perspective view of the thrust bearing assembly shown in FIG. 1.
Figure 3:
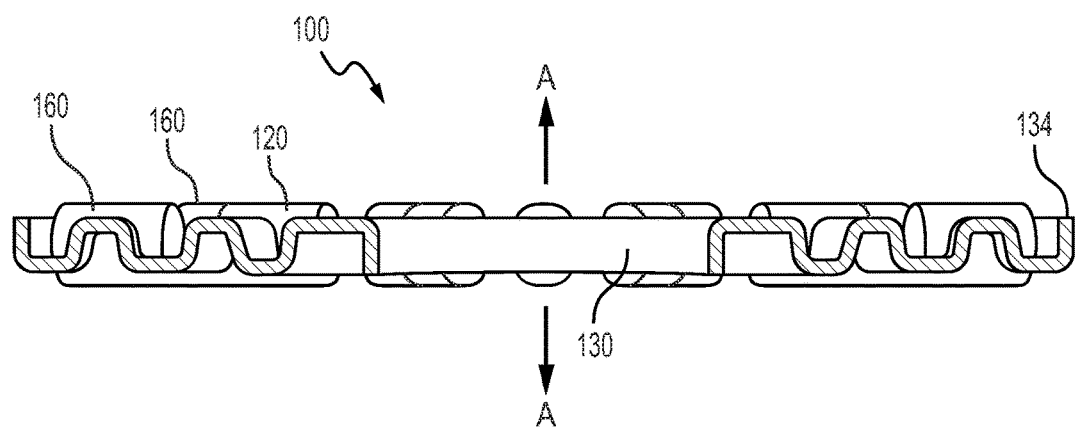
FIG. 3 is a cross-sectional side view of the thrust bearing assembly shown in FIG. 1.

Referring now to FIGS. 1-3, a roller thrust bearing assembly 100 in accordance with an embodiment of the present invention is illustrated. Bearing assembly 100 includes a roller retainer cage 110 formed of a suitable material (typically metal). Cage 110 retains a plurality of roller elements that extend in a radial direction with respect to a central axis A (FIG. 3). In this case, a first plurality of roller elements 120 and a second plurality of roller elements 160 are rotatably received in configured openings defined in the cage 110. The first plurality of roller elements 120 are located radially inward of the second plurality of roller elements 160, as shown.

Roller retainer cage 110 includes an annular portion 112 located radially between a first annular flange 130 that extends axially from an inner peripheral edge of the annular portion 112 and a second annular flange 134 extends axially from an outer peripheral edge of the annular portion 112. Annular portion 112 of the roller retainer cage 110 is substantially disc-shaped, as shown, with the inner peripheral edge and the outer peripheral edge being substantially concentric about the longitudinal center axis A. In this case, first annular flange 130 and second annular flange 134 are of substantially the same height but extend in opposite axial directions.

Annular portion 112 of roller retainer cage 110 defines a first plurality of roller pockets 114 and a second plurality of roller pockets 116. As one skilled in the art will appreciate, edges of the roller pockets are configured to retain roller elements for rotation therein. In this embodiment, each individual roller pocket of the first plurality of roller pockets 114 is configured to receive two roller elements therein, the innermost roller element being from the first plurality of roller elements 120 and the outermost roller element being from the second plurality of rollers elements 160. As shown, the roller elements 120 and 160 in each of the first plurality of roller pockets 114 are aligned with each other in the radial direction such that they share a common rolling axis. The roller pockets 114 of the first plurality of roller pockets are angularly spaced in equal increments about the annular portion 112 of the roller retainer cage 110.

In this case, each roller pocket 116 of the second plurality of roller pockets receives a single roller element 160 from the second plurality of roller elements. The second plurality of roller pockets 116 is configured so that the roller elements 160 are equidistant from the longitudinal center axis A of the thrust bearing assembly 100. The roller pockets 116 of the second plurality of roller pockets are spaced apart in equal angular increments about the annular portion 112 of the roller retainer cage 110, but are disposed between adjacent roller pockets 114 of the first plurality of roller pockets. Thus, the first plurality of roller pockets 114 and the second plurality of roller pockets 116 alternate about the angular extent of the roller retainer cage 110.

In the illustrated embodiment, it can be seen that ten first roller pockets 114 and ten second roller pockets 116 are provided. This accommodates a total of thirty roller elements. One skilled in the art will appreciate that embodiments are contemplated with less or more pockets and rolling elements as necessary or desired.

Figure 4:
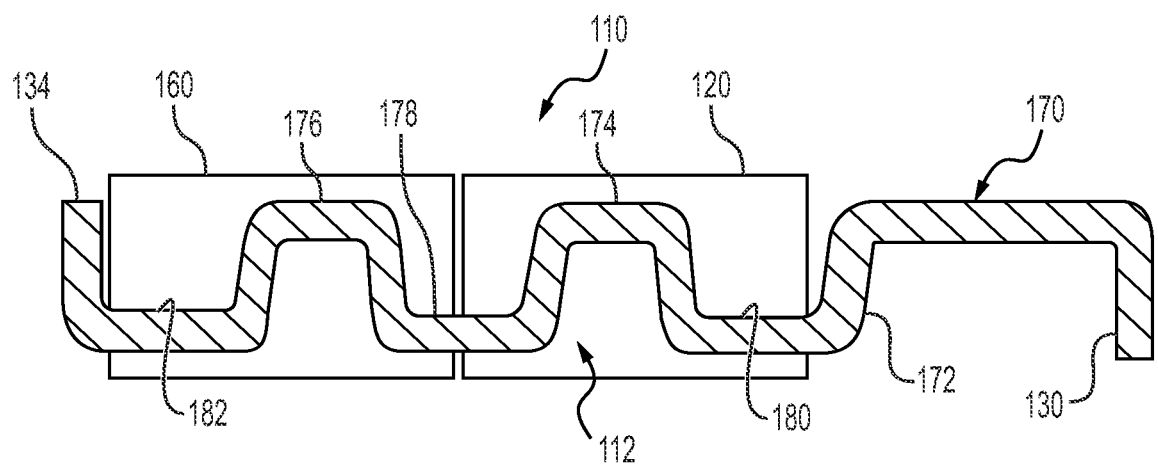
FIG. 4 is a cross-sectional view taken along line 4-4 of FIG. 1.

Referring now to FIG. 4, certain additional information regarding the construction of roller retainer cage 110 can be most easily explained. In this embodiment, roller retainer cage 110 defines a hub portion 170 located in radial area between the innermost end of roller elements 120 and first annular flange 130. A third annular flange 172 delimits the outermost extent of hub 170 in the radial direction. The radial area between second annular flange 134 and third annular flange 172 defines first and second annular hills 174 and 176 separated by an intermediate (in the radial direction) annular valley 178. An innermost annular valley 180 extends between third annular flange 172 and first annular hill 174. An outermost annular valley 182 extends between second annular hill 176 and second annular flange 134. (As one skilled in the art will appreciate, whether a feature is termed a "hill" or a "valley" depends on which side of cage 110 is considered the "top." For present purposes, the surface visible in FIG. 1 is considered the top.)

Referring now also to FIGS. 1-3, the first plurality of roller pockets 114 are defined in both hills 174 and 176 as well as valleys 178, 180, and 182. In contrast, second plurality of roller pockets 116 are defined only in hill 176, valley 182, and halfway into valley 178. In each case, the associated roller element will extend (in the radial direction) completely through one of the hills such that an intermediate portion of the roller element will be adjacent to the corresponding hill on both sides, with the respective ends of each roller element being adjacent one of the valleys.

The combination of multiple spaced apart hills with adjacent valleys forms a multiple sigma configuration (in this case, a double sigma configuration). Such a configuration provides a desirable roller diameter to roller length ratio in comparison with traditional sigma cage designs. While two such concentric hills and three valleys are illustrated above, one skilled in the art will appreciate that the pattern could continue to provide three concentric annular hills, four concentric annular hills, etc. as necessary or desired. The number of associated roller elements in such embodiments would typically multiply as additional hill-valleys are added.

It can thus be seen that the present invention provides a novel thrust bearing configuration. While one or more preferred embodiments of the invention are described above, it should be appreciated by those skilled in the art that various modifications and variations can be made in the present invention without departing from the scope and spirit thereof.

The invention claimed is:

1. A thrust bearing assembly, comprising:
   a cage including an annular portion, a first flange extending axially from an inner peripheral edge of the annular portion, and a second flange extending axially from an outer peripheral edge of the annular portion;
   a first plurality of roller pockets defined by the annular portion, the first roller pockets of the first plurality of roller pockets being spaced evenly about the annular portion;
   a second plurality of roller pockets defined by the annular portion, the second roller pockets of the second plurality of roller pockets being evenly spaced about the annular portion so that each second roller pocket is disposed between adjacent first roller pockets;
   wherein:
   each first roller pocket includes two radially aligned roller elements disposed therein and each second roller pocket including one roller element disposed therein;
   the annular portion of the cage defines an innermost valley, a first annular hill, an intermediate valley, a second annular hill, and an outermost valley, all of which are concentric with each other;
   each of said first plurality of roller pockets are defined in all of said innermost valley, said first annular hill, said intermediate valley, said second annular hill, and said outermost valley;

each of said second plurality of roller pockets are defined only in said intermediate valley, said second annular hill, and said outermost valley;

a first one of the two radially aligned roller elements in each said first plurality of roller pockets extends adjacent to said first annular hill;

a second one of the two radially aligned roller elements in each said first plurality of roller pockets extends adjacent to said second annular hill;

respective ends of each of the first one and the second one of the two radially aligned roller elements extend beyond an associated one of the first annular hill and the second annular hill such that the respective ends are adjacent one of the valleys; and wherein said cage is formed of a unitary piece of metal.

2. A thrust bearing assembly as set forth in claim 1, wherein respective ends of the roller element disposed in a respective one of said second roller pockets are adjacent one of the valleys.

3. A thrust bearing assembly as set forth in claim 2, wherein the annular portion of the cage further defines a hub portion radially inside of and concentric with said innermost valley.

4. A thrust bearing assembly as set forth in claim 1, wherein said first plurality of roller pockets includes at least ten roller pockets and said second plurality of roller pockets includes at least ten roller pockets.

5. A thrust bearing assembly as set forth in claim 1, comprising at least thirty of said roller elements.

6. A thrust bearing assembly comprising:

a cage including an annular portion defining an innermost valley, a first annular hill, an intermediate valley, a second annular hill, and an outermost valley, all of which are concentric with each other;

a first plurality of roller pockets defined by the annular portion, the roller pockets of the first plurality of roller pockets being spaced evenly about the annular portion;

the roller pockets of the first plurality of roller pockets each being defined in all of said innermost valley, said first annular hill, said intermediate valley, said second annular hill, and said outermost valley;

two radially aligned roller elements disposed in each of the roller pockets;

wherein:
a first one of the two radially aligned roller elements in each said roller pocket extends adjacent to said first annular hill;

a second one of the two radially aligned roller elements in each said roller pocket extends adjacent to said second annular hill; and respective ends of each of the first one and the second one of the two radially aligned roller elements extend beyond an associated one of the first annular hill and the second annular hill such that the respective ends are adjacent one of the valleys; and wherein said cage is formed of a unitary piece of material.

7. A thrust bearing assembly as set forth in claim 6, further comprising:

a second plurality of roller pockets defined by the annular portion each having a single roller element disposed therein, the second roller pockets each being disposed between adjacent first roller pockets.

8. A thrust bearing assembly as set forth in claim 7, wherein each of said second plurality of roller pockets are defined only in said intermediate valley, said second annular hill, and said outermost valley.

9. A thrust bearing assembly as set forth in claim 8, wherein respective ends of the roller element disposed in a respective one of said second roller pockets are adjacent one of the valleys.

10. A thrust bearing assembly as set forth in claim 7, wherein said first plurality of roller pockets includes at least ten roller pockets and said second plurality of roller pockets includes at least ten roller pockets.

11. A thrust bearing assembly as set forth in claim 7, wherein the annular portion of the cage further defines a hub portion radially inside of and concentric with said innermost valley.

12. A thrust bearing assembly as set forth in claim 7, comprising at least thirty of said roller elements.

* * * * *